United States Patent [19]
Suzuki

[11] Patent Number: 5,585,963
[45] Date of Patent: Dec. 17, 1996

[54] DIGITAL IMAGE SIGNAL RECORDING APPARATUS

[75] Inventor: Takao Suzuki, Kanagawa, Japan

[73] Assignee: Sony Corporation, Tokyo, Japan

[21] Appl. No.: 349,998

[22] Filed: Nov. 29, 1994

[30] Foreign Application Priority Data

Nov. 30, 1993 [JP] Japan .................................. 5-300427

[51] Int. Cl.⁶ .............................. H04N 5/76; H04N 7/12
[52] U.S. Cl. ................................................ 386/46; 348/405
[58] Field of Search ........................................ 358/335, 342,
358/310; 348/384, 390, 419, 404, 405,
406; 382/244, 245, 246; 341/200

[56] References Cited

U.S. PATENT DOCUMENTS 5,038,209  8/1991  Hang ........................................ 358/136
5,218,650  6/1993  Blonstein et al. ........................ 382/56
5,477,397  12/1995  Naiomballey et al. ................. 360/10.3

*Primary Examiner*—Howard W. Britton
*Assistant Examiner*—Robert Chevalier
*Attorney, Agent, or Firm*—William S. Frommer; Alvin Sinderbrand

[57]  ABSTRACT

A digital image signal recording apparatus can record a digital image signal in which a picture quality can be prevented from being deteriorated even when dubbing is repeated. The digital image signal recording apparatus in which a digital image signal is recorded in the form of a compressed digital image signal uses an even rounding circuit as a device for rounding a signal calculated result. The even rounding circuit includes an added value generating circuit (104) for generating an added value to be added to an input digital signal at its low-order bits to be rounded-off, an adder (102) for adding the added value to the input digital signal, and a circuit (106) for omitting the low-order bits of an added result.

3 Claims, 11 Drawing Sheets

DIGITAL IMAGE SIGNAL RECORDING APPARATUS

FIELD OF THE INVENTION

The present invention relates to signal processing in which a digital image signal is recorded in the form of a compressed digital image signal and reproduced in the form of an expanded digital image signal, More particularly, this invention relates to a digital image signal recording apparatus using an image coding system with a rounding system in which accumulated error can be prevented from being increased when dubbing is repeated.

BACKGROUND OF THE INVENTION

Japanese laid-open patent publication No. 4-168603 for example, describes a magnetic recording and reproducing system for magnetically recording and reproducing a digital image signal by image compression. According to this magnetic recording and reproducing system, it becomes possible to record a digital image signal for a long time by properly selecting an amount of information of the digital image signal and density with which the digital image signal is recorded on a magnetic tape.

Further, an input digital image signal is converted by a blocking circuit to data of block unit composed of a plurality of pixel data. Output data from the blocking circuit is compression-coded by a coding circuit. An output from the coding circuit is supplied through a channel coding circuit to a magnetic head and thereby recorded on the magnetic tape.

As an example of the block coding circuit, there is proposed a block coding circuit in which pixel data of each block is processed in a DCT (discrete cosine transform) fashion, coefficient data thus obtained by DCT is quantized and quantized data is compression-coded by run-length Huffman coding.

In a bit rate reduction VTR (video tape recorder), calculation error occurs at three portions, which will be described below with reference to FIG. 1.

As shown in FIG. 1 of the accompanying drawings, calculation error occurs at three portions, i.e., a discrete cosine transform (DCT) circuit 2, a quantization (Q) circuit 3 and an inverse discrete cosine transform (IDCT) circuit 9 as shown by reference symbols "$\epsilon$".

The DCT circuit 2 will be considered initially. The DCT circuit 2 performs calculation of trigonometric function, and a calculated result of the DCT circuit 2 is given by an irrational number. Therefore, when the calculated result is rounded by a finite bit rate, a calculation error occurs. When a calculated result N bits of the DCT circuit 2 are rounded by 12 bits, a calculation error occurs.

An output from the DCT circuit 2 is quantized by the quantization circuit 3 and thereby suppressed to data of a predetermined data amount. A bit rate obtained at that time is changed with a quantization step size. For example, the bit rate changes in a range of from 11 bits (maximum) to 1 bit (minimum). Specifically, assuming that M is the bit rate, then M changes in a range of from 1 to 11 bits. Therefore, a calculation error occurs.

When the digital image signal is reproduced, if the digital image signal is rounded to 8 bits after it had been processed in an IDCT fashion, then a calculation error occurs.

As shown in FIG. 1, a calculation error does not occur in a variable length coding (VLC) circuit 4, a variable length decoding (VLD) circuit 7 and an inverse quantization ($Q^{-1}$) circuit 8.

Accumulation of calculation errors caused by the rounding system is not a serious problem so long as the digital image signal is compressed and expanded only one time. However, when the VTR is in use, it is customary that recorded contents on the magnetic tape are dubbed. Thus, a picture quality obtained in a so-called multi-generation (picture recorded when dubbing is made several times) becomes an important factor. Particularly, when the digital image signal is repeatedly compressed and expanded according to the same algorithm, a calculation error is accumulated in the same direction, which causes a problem that can not be neglected.

A rounding circuit used in this kind of apparatus is based on the rounding-off. Therefore, when numeral placed after omitted bits (digits) (i.e., placed after the decimal point) are 0.5, there occurs a maximum calculation error. In this case, a numeral is rounded to an integer of which absolute value is larger.

Let it be considered that the digital image signal is dubbed by a bit rate reduction VTR, for example. In this case, it is unavoidable that the digital image signal is repeatedly compressed and expanded each time dubbing is made. As a result, according to the ordinary rounding-off, a rounding error is accumulated each generation of dubbing (i.e., each time dubbing is made), thereby a picture quality being deteriorated.

The reason for this is that, each time the digital image signal is compressed and expanded, DCT coefficient and image data whose numeral is 0.5 in decimal notation is generated. In concurrently therewith, the numeral is rounded to an integer whose absolute value is larger.

As a consequence, a calculation error is accumulated in the same direction so that perceptible block distortion, such as direct current (DC) level shift or the like occurs. Although it is frequently observed that this error is converged when dubbing is carried our several times, i.e., deterioration of a picture quality does not proceed any more, in worst cases, a calculation error is accumulated infinitely each time dubbing is made.

Furthermore, when an inner calculation accuracy is not sufficient, an influence exerted by a rounding error becomes more remarkable. The reason for this is that, the probability that DCT coefficient or image data of 0.5 will occur becomes large as the inner calculation accuracy is lowered. As a result, a convergence of accumulated error is delayed.

SUMMARY OF THE INVENTION

It is therefore an object of the present invention to provide a digital image signal recording apparatus in which an influence exerted by a rounding error can be alleviated and in which a picture quality can be prevented from being deteriorated even when a digital video signal is repeatedly dubbed.

According to an aspect of the present invention, there is provided a digital image signal recording apparatus which comprises a bit rate reduction circuit for reducing a bit rate of a digital image signal, a quantization circuit, and a rounding circuit provided at least on one portion of the digital image signal recording apparatus for rounding a calculated result of a signal, wherein when values of a numeral placed after omitted bits are 1000 in binary notation (i.e., 0.5 in decimal notation), the rounding circuit detects whether an integral part of the numeral is an even or odd number, i.e., whether a least significant bit of an integral part of a binary number is 0 or 1 so that the rounding circuit rounds the numeral if the least significant bit is 0, the rounding circuit rounds the numeral to a closest even number by omitting the numeral after 1000 in binary notation (i.e., 0.5 in decimal notation) were added to the numeral if the least significant bit is 1 and that the rounding circuit rounds off the numeral in other cases.

DETAILED DESCRIPTION OF THE PREFERRED EMBODIMENT

A digital image signal recording apparatus according to an embodiment of the present invention will be described below with reference to the drawings.

The following three round methods based on rounding-off are known:

(a) positive round (+∞ direction);

(b) infinite round (±∞ direction); and (c) even round

These round methods differ from each other in a manner to process data when numeral placed after the decimal point is 0.5 by decimal notation.

The positive round (a) is the simplest method wherein numeral is raised in the positively direction when the numeral is 0.5. Assuming that a round number of a certain number n is expressed as RND(n), then the RND(n) is calculated as numeral in which 0.5 is raised in the positive direction, such as RND(1.5) +RND(2.5)=5 and RND(−3.5)+ RND(4.5)=2. This positive round will be described more fully with reference to FIG. 2.

Figure 2:
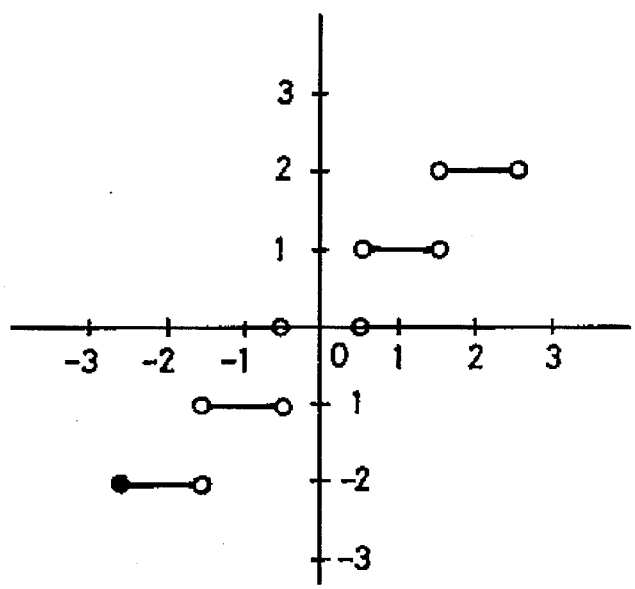
FIG. 2 is a diagram used to explain positive round.

In FIG. 2, a horizontal axis represents an input signal and a vertical axis represents an output signal. When the input signal is 0.5, 1.5 and 2.5, for example, points of 0, 1, 2 on the vertical axis are represented by open circles in FIG. 2. This means that the input signal does not take these values but take solid circles on 1, 2, 3 on the vertical axis, i.e., 0.5 is raised.

Figure 3:
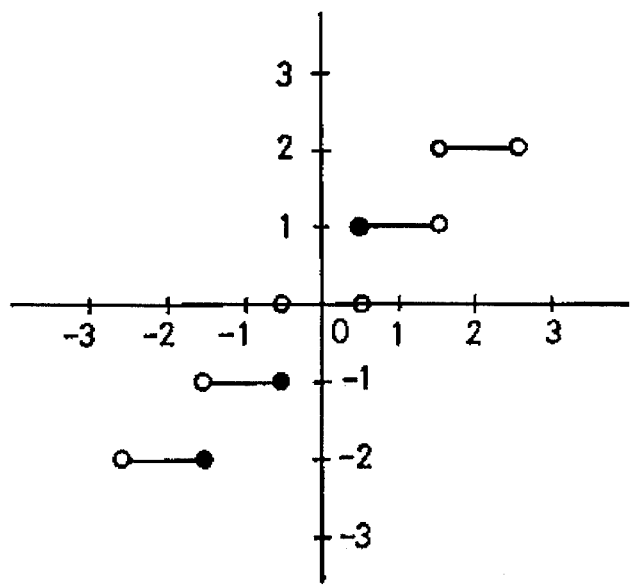
FIG. 3 is a diagram used to explain infinite round.

The infinite round (b) is the normal rounding-off method in which the positive round (a) is expanded to a negative numeral. According to the infinite round, RND (1.5)+ RND(2.5)=5 and RND(−3.5)+RND(4.5)=1 are obtained. RND(1.5)+RND(2.5)=5 is the same as that in the positive round (a) but RND(−3.5)+RND(4.5)=1 is different from RND(−3.5)+RND(4.5) =2 because −3.5 is changed to −4 by rounding. FIG. 3 shows this state.

The even round (c) is the calculation method in which numeral is rounded to an even number when a numeral placed after the decimal point is 0.5. This even round (c) is what might be called a bankers round and is adopted in the standardization (IEEE 754) as a floating point rounding method used in a calculator.

Figure 4:
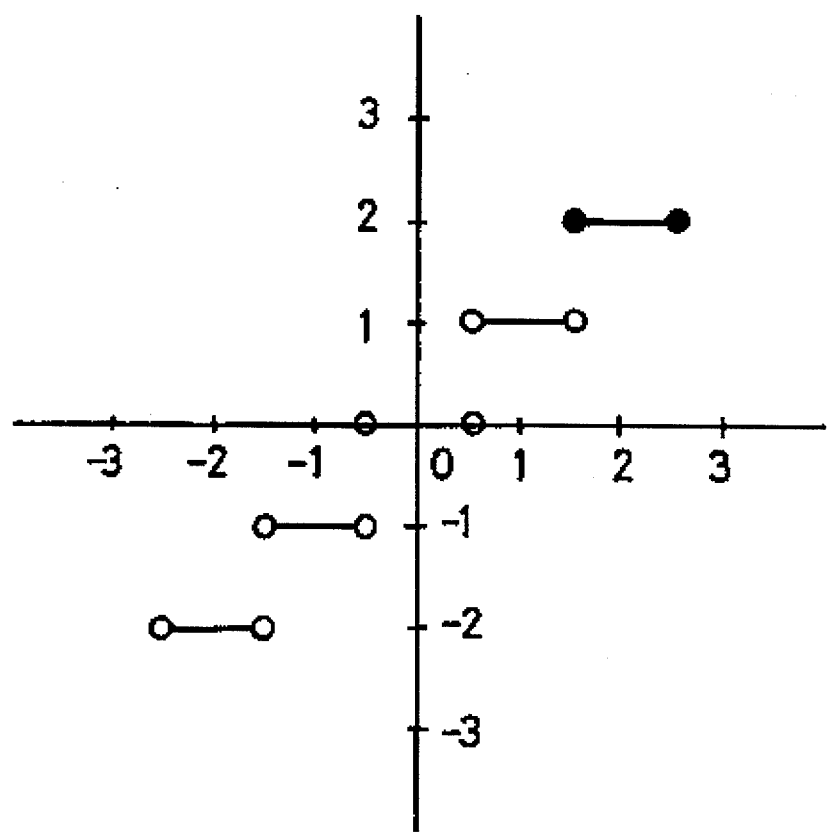
FIG. 4 is a diagram used to explain even round.

According to the even round, RND (1.5)+RND(2.5)=4, and RND(−3.5)+RND(4.5)=0, for example, because 1.5 is rounded to 2 and 2.5 is rounded to 2. Thus, added result of 2+2 becomes 4. Also, −3.5 is rounded to −4 and 4.5 is rounded to 4. Thus, added result of −4 and 4 becomes 0. FIG. 4 shows this state.

In FIG. 4, open circles represent that values on the open circles are not taken. Solid circles in FIG. 4 represent that values on the solid circles are taken. Therefore, when the input signal ranges from −0.5 to 0.5, there is no output signal. When the input signal is larger than 0.5 but less than 1.5, the output signal is 1. When the input signal ranges from 1.5 to 2.5, the output signal is 2.

According to the negative round, similarly, when the input signal is smaller than −0.5 but larger than −1.5, the output signal is −1. When the input signal ranges from −1.5 to −2.5, the output signal is −2.

Having examined a point in which rounded-off number is 0.5 by rounding, a numeral is rounded such that the rounded numbers becomes even numbers, such as when 0.5 becomes 0, 1.5 becomes 2, −0.5 becomes 0 and −1.5 becomes −2.

The three rounding methods (a) to (c) were described so far. According to any one of the above-mentioned methods (a) to (c), when a numeral placed after the decimal point is 0.5, a rounding error becomes maximum. Absolute values of errors obtained at that time become the same regardless of the type of the round methods.

Figure 5:
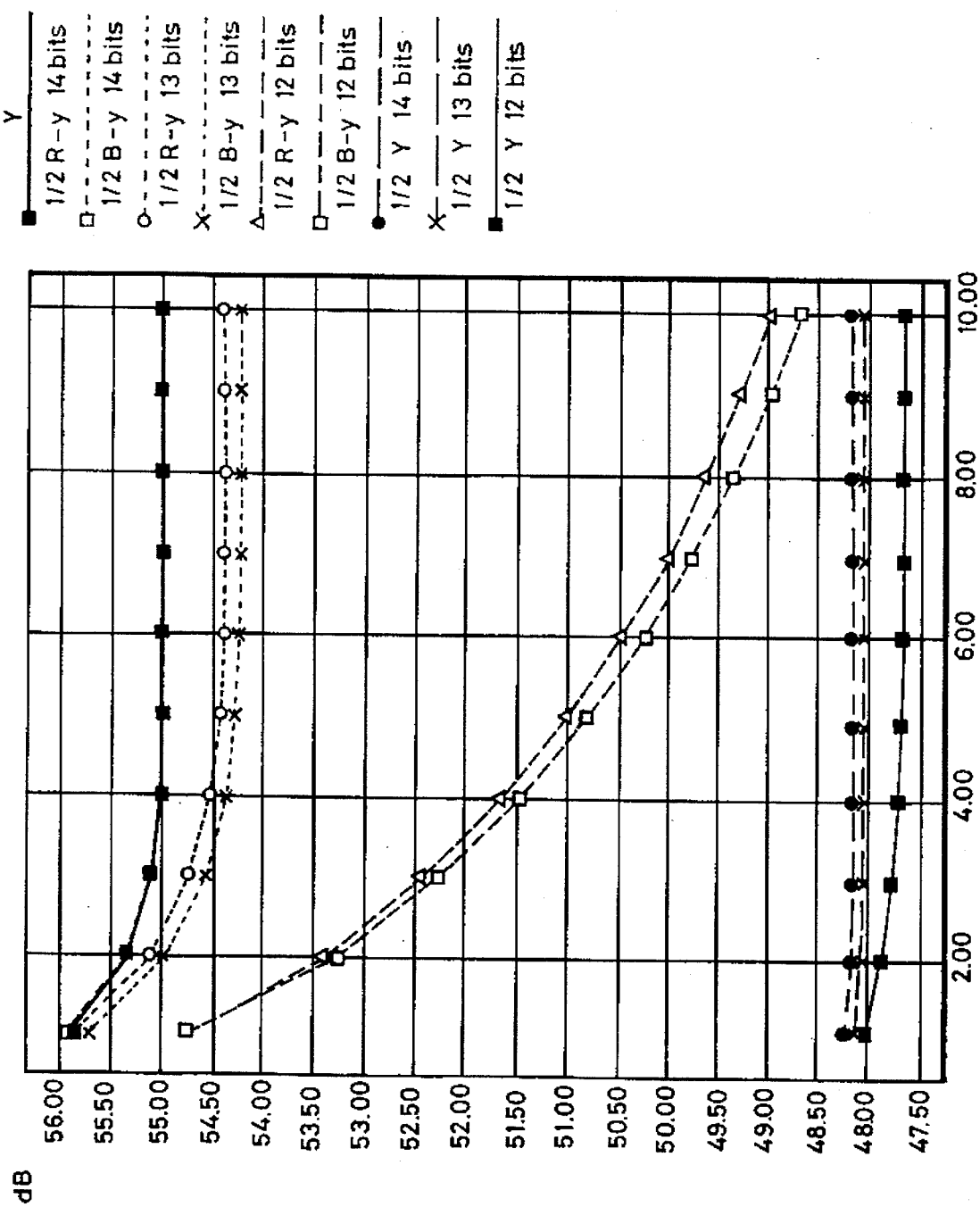
FIG. 5 is a diagram showing measured results of S/N with direct dub by DCT accuracy (positive round)

FIG. 5 shows simulated results obtained when dubbing is repeated straight under the condition that DCT accuracy is 12 bits, 13 bits and 14 bits. In this simulation, a particular evaluation image compressed with a compression rate of ½ was used. According to this simulation, DCT and IDCT calculations are carried out by the floating point and a numeral is rounded to an integer by using a function based on the IEEE 754 standardization. When a digital image signal is quantized, a numeral is rounded by the above-mentioned positive round (a).

Figure 6:
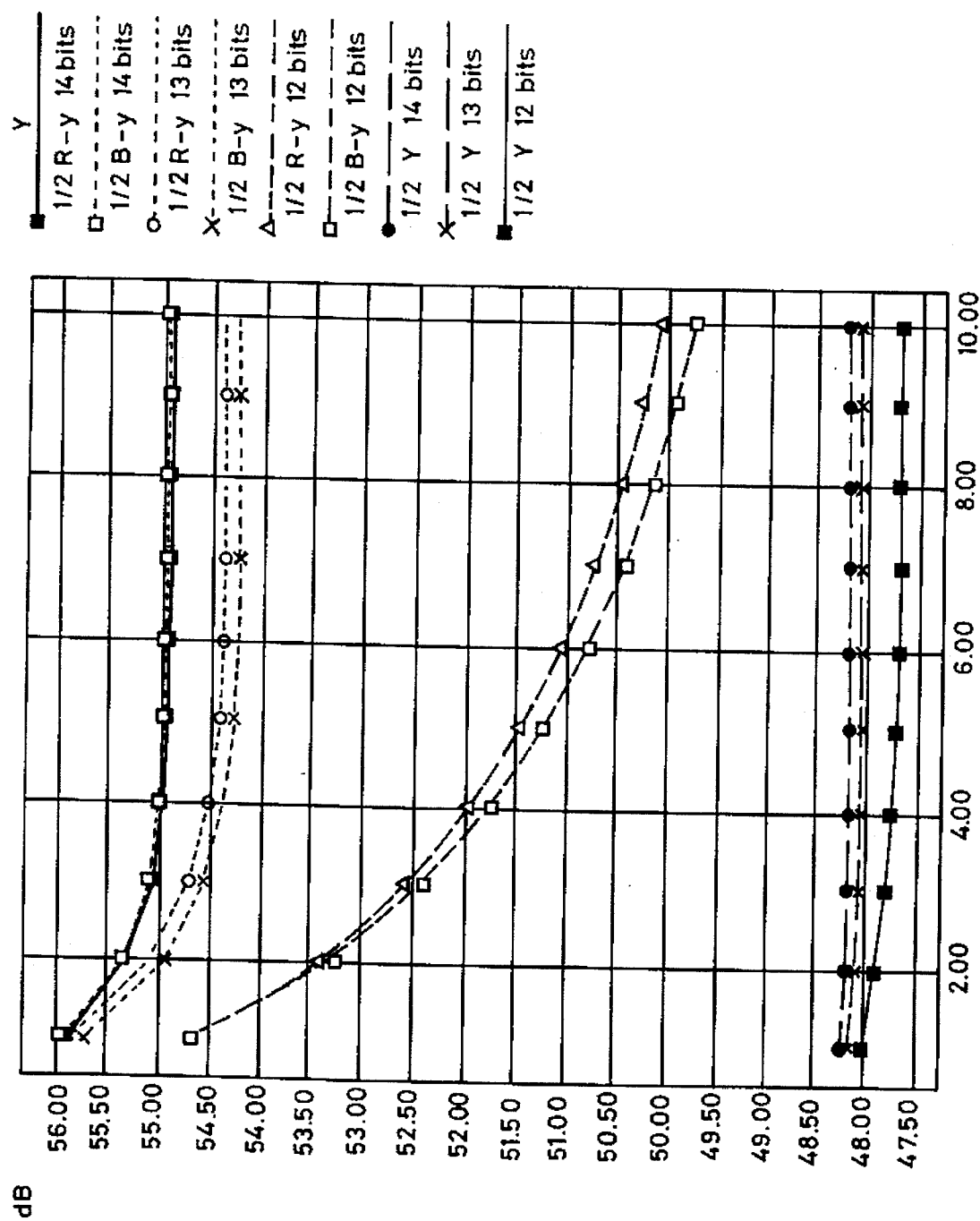
FIG. 6 is a diagram showing measured results of S/N with direct dub by DCT accuracy (infinite round)
Figure 7:
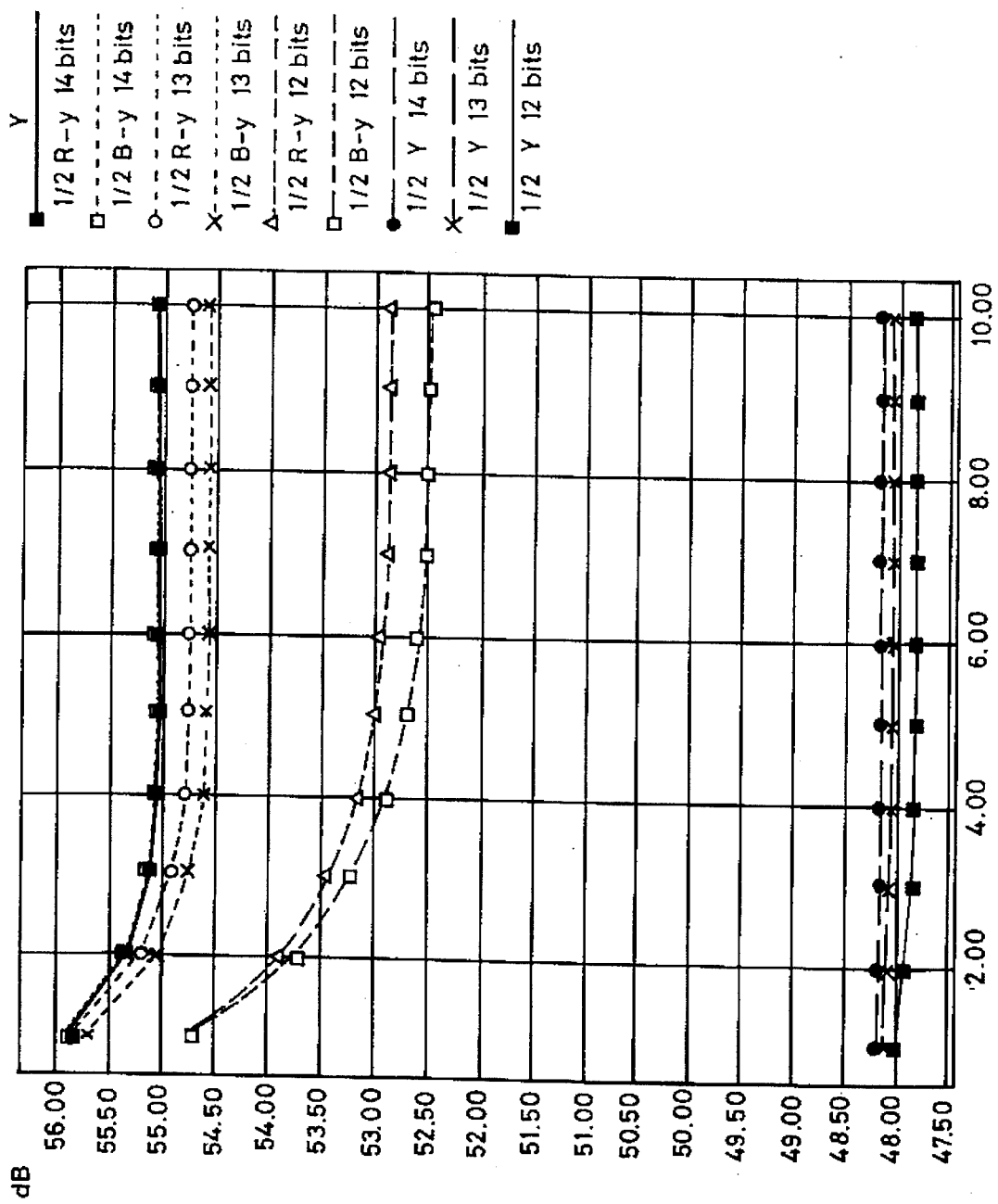
FIG. 7 is a diagram showing measured results of S/N with direct dub by DCT accuracy (even round)

FIGS. 6 and 7 show simulated results obtained when a numeral was rounded according to the infinite round (b) and the even round (c) in the quantization. As shown in FIG. 7, when a numeral is rounded by the infinite round (b), a curve representing a deterioration of S/N (signal-to-noise ratio) becomes very slightly gentle as compared with that of the positive round (a). As shown in FIG. 7, when a numeral is rounded by the even round (c), a curve representing a deterioration of S/N becomes gentle as compared with those of the positive round (a) and the infinite round (b), and the curve is converged in the early generation. Particularly, when a DCT accuracy is low, i.e., 12 bits, a difference between S/N deterioration curves become large.

A bit rate reduction based on Wavelet-transform is excellent in picture quality as compared with the DCT. A Wavelet-transform based on Haar base can be realized by addition and subtraction of integers and the frequency can be analyzed after the block is divided similarly to the DCT. Thus, the hardware of the digital image signal recording apparatus can be reduced in scale.

Figure 1:
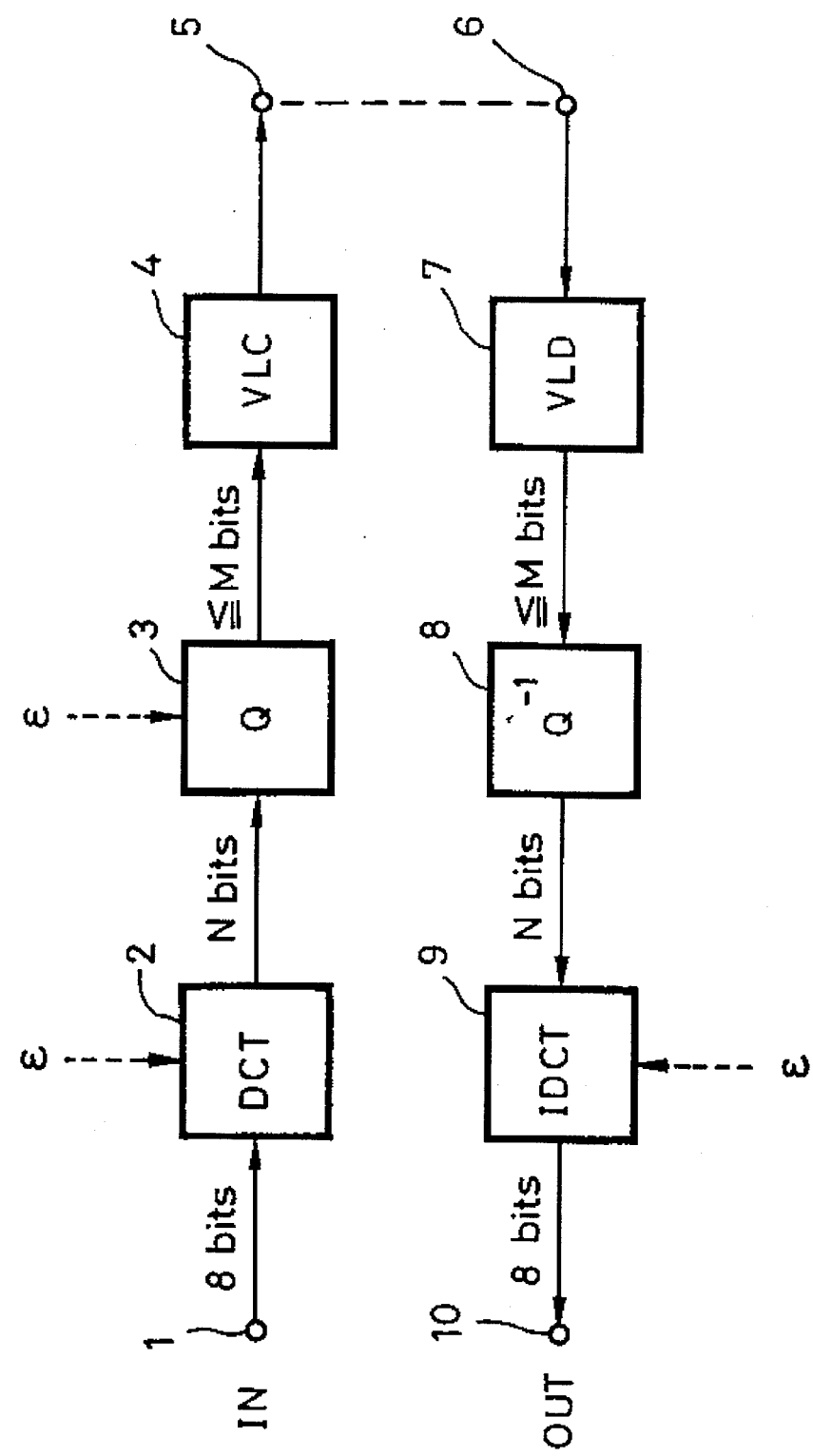
FIG. 1 is a schematic block diagram showing an example of a bit rate reduction VTR.

Therefore, the simulation was carried out under the condition that the DCT circuit 2 shown in FIG. 1 was replaced with a DWT (discrete wavelet transform) circuit which processes an image in which a picture is formed of 10 picture segments and each picture is formed of 8×8 blocks based on Harr base. Unlike the DCT calculation, the DWT calculation is carried out by integers and the output signal is rounded to 12 bits, 13 bits and 14 bits. DWT calculation accuracy is 14 bits at maximum and in this case, no rounding error occurs. The rounding systems of DWT and IDWT (inverse discrete wavelet-transform) are selected to be the same as that of the quantization and there exist three rounding portions. These rounding portions were compared according to the above-mentioned three rounding methods (a), (b) and (c).

Figure 8:
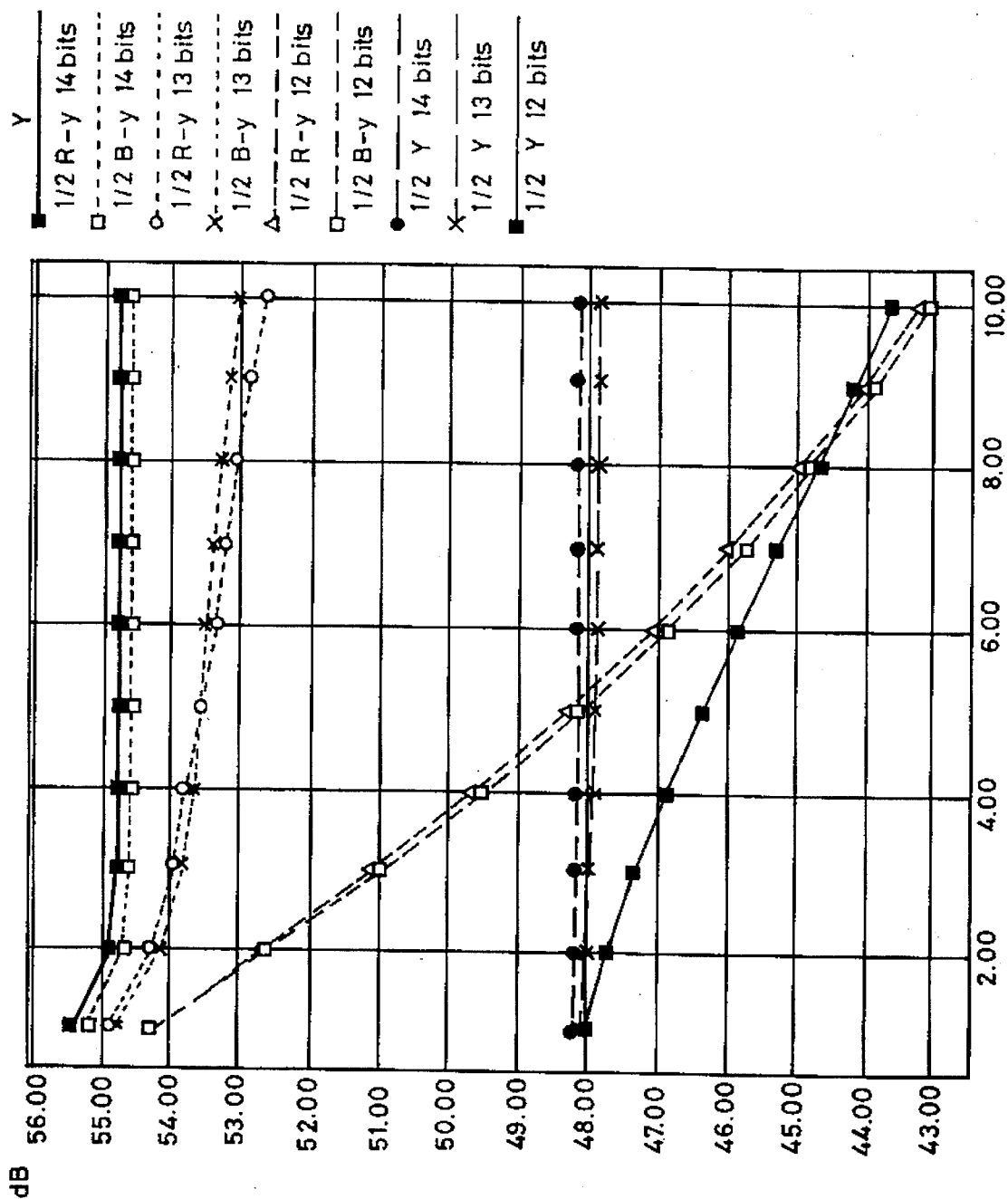
FIG. 8 is a diagram showing measured results of S/N with direct dub by DWT accuracy (positive round)
Figure 9:
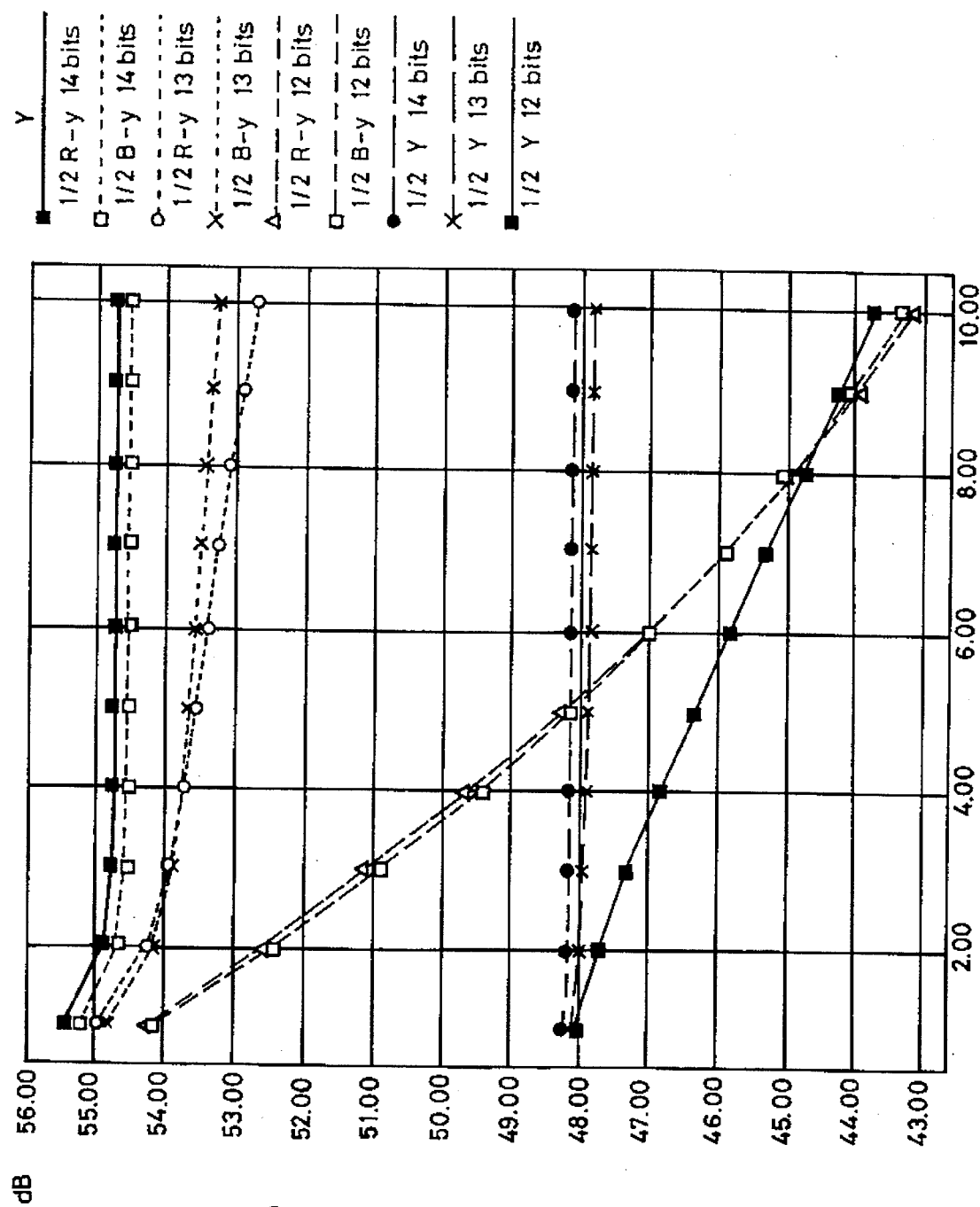
FIG. 9 is a diagram showing measured results of S/N with direct dub by DWT accuracy (infinite round)
Figure 10:
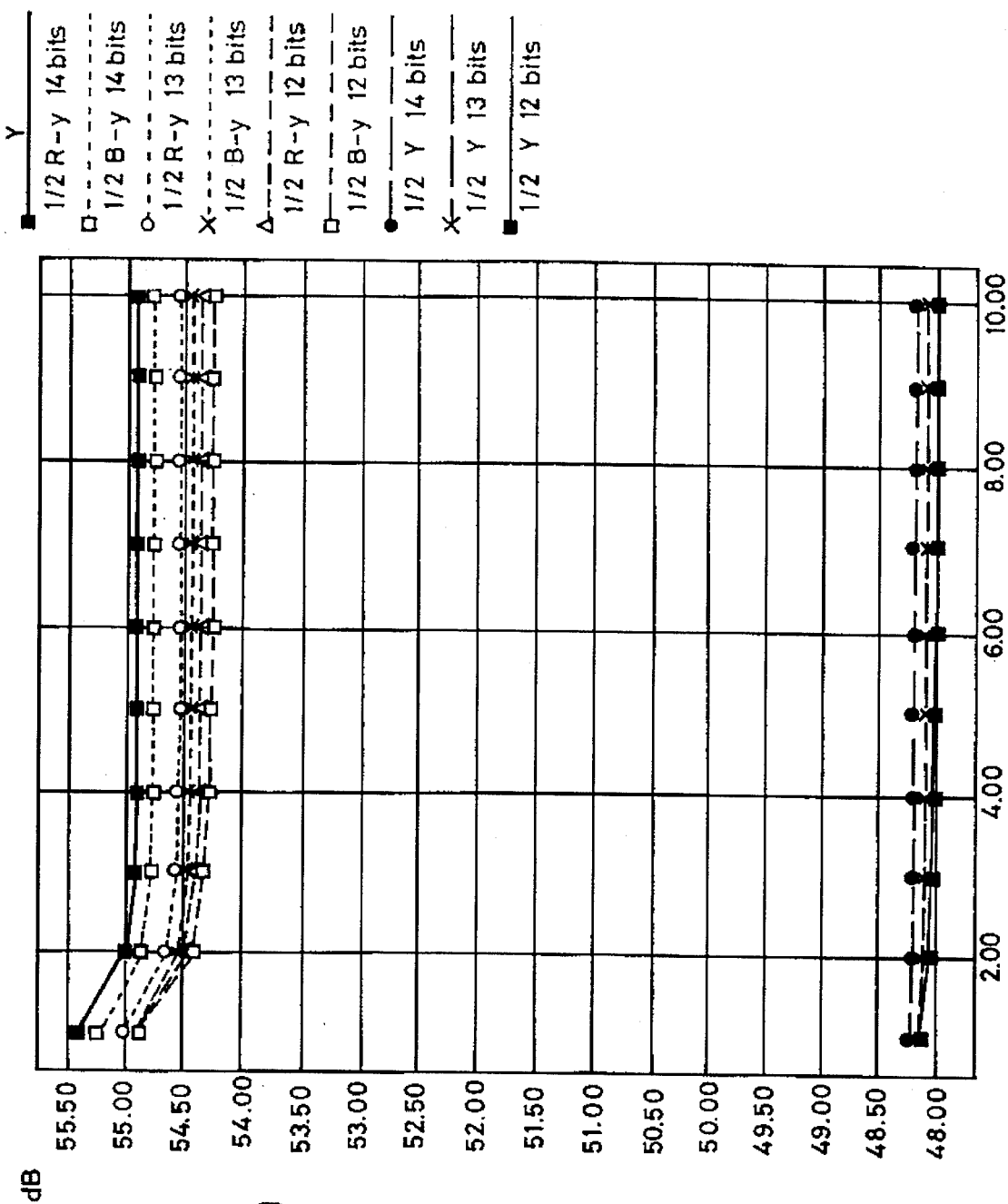
FIG. 10 is a diagram showing measured results of S/N with direct dub by DWT accuracy (even round)

FIGS. 8, 9 and 10 show compared results. An evaluation image and a compression ratio are the same as those of DCT. Study of FIGS. 8, 9 and 10 reveals that the positive round (a) and the infinite round (b) show the same tendency and that, when DWT calculation accuracy is 12 bits, a deterioration of S/N is increased and a calculation error is accumulated with the increase of generation (dubbing). According to the even round (c), when DWT calculation accuracy is 12 bits, a deterioration of S/N is small and a calculation error is converged within 3 to 4 generations (3 to 4 dubbings).

As described above, study of compared results shows that the even round is small in accumulation of rounding errors as compared with other rounding methods even when a calculation accuracy is not sufficient. The reason for this is that, if the bit number to be omitted is small, there is then the large probability that DCT coefficient or image data of 0.5 occurs. Thus, the even round becomes remarkably effective.

The bit rate reduction VTR which is required to provide a picture of high picture quality should preferably maintain a sufficient calculation accuracy or should preferably adopt the even round.

Taking the above-mentioned simulated results into consideration, an even round circuit is used as a rounding circuit according to the present invention.

Figure 11:
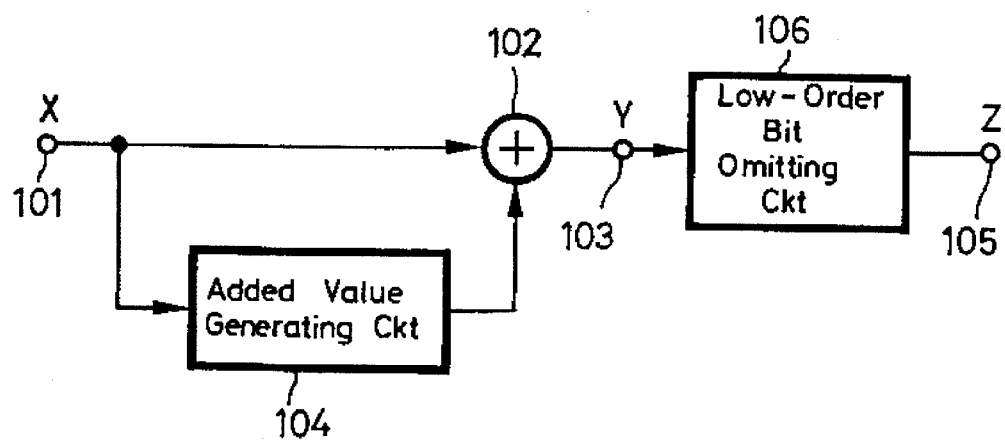
FIG. 11 is a block diagram showing an example of an even round circuit used in the digital image signal recording apparatus according to an embodiment of the present invention.

FIG. 11 is a block diagram showing a rounding circuit which can realize the even round. As shown in FIG. 11, an input signal X supplied to an input terminal 101 is a digital signal of A bits and an output signal Z output to an output terminal 105 is a digital signal of B bits.

An added value generating circuit 104 detects whether or not a low-order (A−B) bits of the input digital signal X are 0.5 by decimal notation. Then, the added value generating circuit 104 determines whether the (A−B+1) bit from below is even or odd (i.e., 0 or 1 in binary notation). The added value generating circuit 104 thus determines added values xxxx (numeral of 4 bits).

Figure 12:
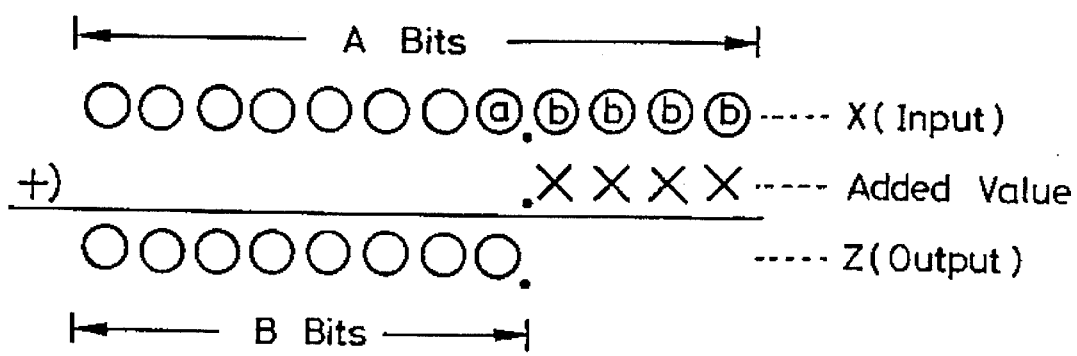
FIG. 12 is a schematic diagram used to explain round calculation.

The outputs xxxx from the added value generating 104 are added to the input signal X by an adder 102, and the B bits of the signal Y representing an added result are developed at the output terminal 105 as the output signal Z, FIG. 12 shows an example of how to calculate rounding bits. As shown in FIG. 12, low-order (A−B) bits of the input digital signal X are represented by bbbb, and (A−B+1) bit from below is represented by a. A value added to the low-order bits are represented by xxxx. The value of xxxx is determined as shown in FIG. 13.

Figure 13:
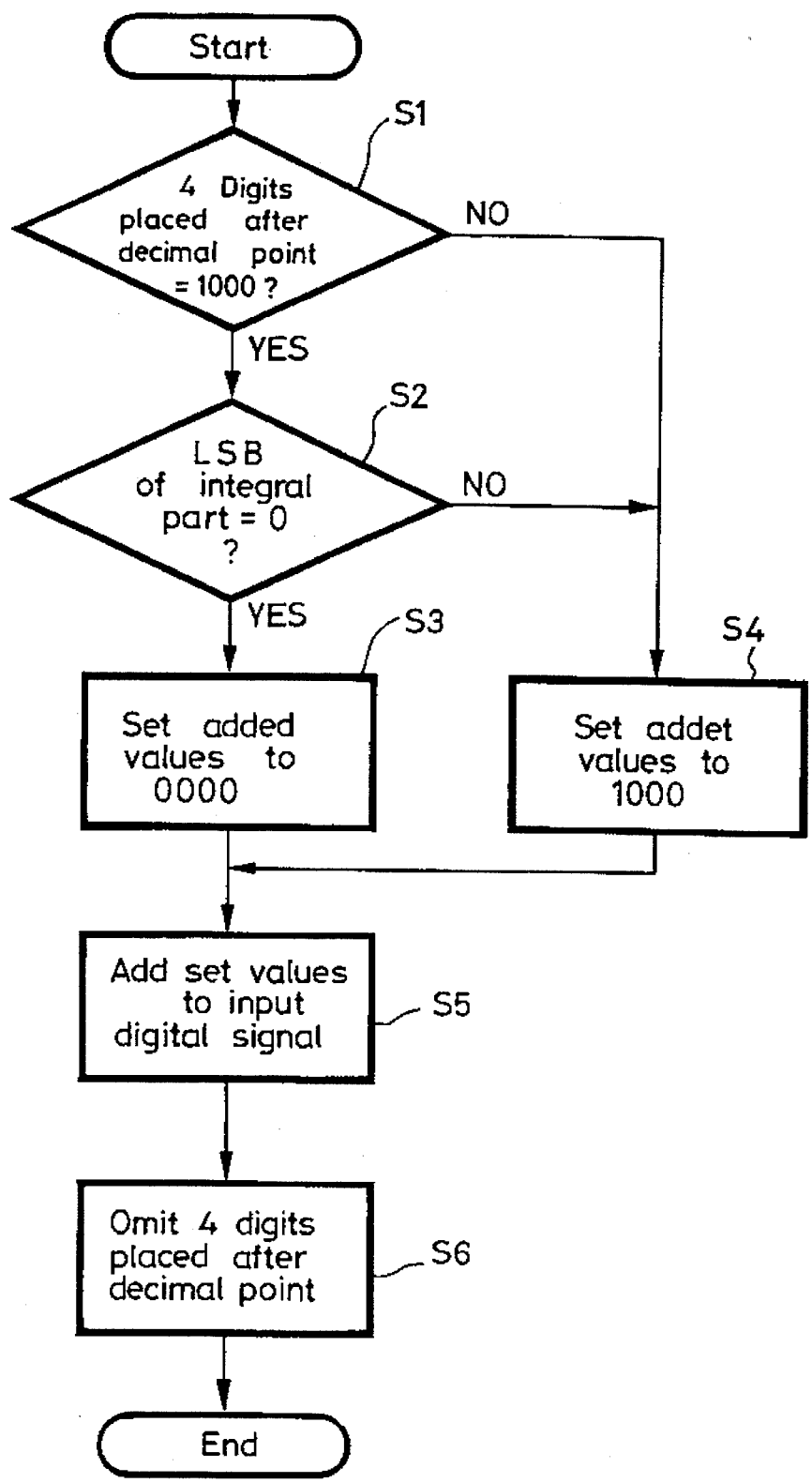
FIG. 13 is a flowchart to which reference will be made in explaining operation of the even round circuit shown in FIG. 11.

FIG. 13 is a flowchart to which reference will be made in explaining a round processing. Operation of the rounding circuit shown in FIG. 11 will be described with reference to FIG. 13.

Referring to FIG. 13, following the start of operation, it is determined in decision step S1 whether or not round-down portions of the input digital signal, i.e., low-order 4 bits (digits) bbbb placed after the decimal point are 1000.

If the 4 bits bbbb are equal to 1000 (i.e., 0.5 in decimal notation) as represented by a YES at decision step S1, then the processing proceeds to the next decision step S2. It is determined in decision step S2 whether or not the least significant bit (LSB) a placed before the decimal point (integral part) of the input signal is equal to 0 (i.e., even number). If the LSB a is equal to 0 as represented by a YES at decision step S2, then the processing proceeds to step S3, wherein numerical values xxxx of 4 bits (digits) that are added to the 4-bit portion bbbb placed after the decimal point of the input signal are set to 0000.

Then, the processing proceeds to step S5, wherein the set values xxxx (in this case, 0000) are added to the input digital signal X and therefore the output digital signal Y is obtained. This operation is carried out by the adder 102 shown in FIG. 11.

In the next step S6, 4 bits placed after the decimal point of the signal Y developed at the output terminal 103 are omitted by a next-stage circuit (depicted by reference numeral 106 in FIG. 11).

If the least significant bit a of the integral part is not 0 (i.e., odd number) as represented by a NO at decision step S1, then the processing proceeds to step S4, whereat the added values xxxx are set to 1000 (i.e., 0.5 in decimal notation). When the set values 1000 (0.5 in decimal notation) and 1000 (0.5 in decimal notation) placed after the decimal point of the input signal X are added in step S5, the digit is increased and the numeral is rounded.

If it is determined in decision step S1 that the 4 digits bbbb placed after the decimal point of the input signal X are not 1000, in other words, if the 4 digits bbbb are greater than 0 and smaller than 0.5 or greater than 0.5 and smaller than 1.0 in decimal notation, then the processing proceeds to step S4, wherein the added values are set to 1000 in binary notation, i.e., 0.5 in decimal notation. Therefore, the digits which are placed after the decimal point of the input signal X are less than 0.5 are added to the input signal in step S5 and the digit is not carried up. However, the digits which are placed after the decimal point are greater than 0.5 are carried up by addition in step S5. Thus, when digits placed after the decimal point are omitted in the next step S6, the normal round-off is carried out.

The above-mentioned operation will be described with reference to FIG. 4. As shown in FIG. 4, with respect to points in which a numeral placed after the decimal point is 0.5, when a numeral placed after the decimal point is an even number, the added value is 0 so that the above-mentioned points become the solid circle points provided at respective ends of the horizontal line of FIG. 4. When a numeral placed before the decimal point is an odd number, the added value is 0.5. Thus, the above-mentioned points are rounded by the numeral that is rounded-up or rounded-off as shown by open circles provided at respective ends of the horizontal line in FIG. 4. It is therefore to be understood that the rounding circuit shown in FIG. 11 functions as the even number rounding circuit.

It is possible to obtain a digital recording and reproducing apparatus with less accumulation error by adding the even rounding circuit (see FIG. 11) to a part of a digital recording and reproducing apparatus using a normal rounding system.

Further, in the bit rate reduction VTR which was described so far with reference to FIG. 1, it is effective to use the even rounding circuit as the quantization (Q) circuit 3. Accordingly, it is possible that the DCT circuit 2 and the IDCT circuit 9 are formed of the normal rounding circuits and that only the quantization circuit 3 is formed of the even rounding circuit.

While the even round circuit is applied to the digital recording and reproducing apparatus of the image compression system based on the DCT (discrete cosine transform) as described above, the present invention is not limited thereto and the even rounding system can be effectively applied to a bit rate reduction VTR which is not based on the compression system of the DCT, such as wavelet-transform or the like.

Not only in the VTR but also in other image coding apparatus, it is frequently observed that DCT and IDCT are recurrently repeated in order to effect motion compensation. There is then the problem that IDCT mismatching occurs between the transmission side and the reception side. The even rounding system is effective in order to decrease the IDCT mismatch.

The even rounding method is the effective method for decreasing an accumulated error when transform/inverse transform are repeated like matrix transform.

According to the digital recording and reproducing apparatus of the present invention, when the calculated result is rounded, if the numeral of the bit to be omitted is just 0.5, such numeral is rounded to be closest even number, the following effects can be achieved:

(1) it is possible to prevent calculation errors from being accumulated when dubbing is made several times;

(2) the even rounding method is effective when the calculation accuracy is not sufficient and a rounding error can be converged in the early generation; and (3) it is possible to prevent an absolute value of a calculation error from being increased as compared with the normal rounding system.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A digital image signal recording apparatus comprising:

bit rate reduction means for reducing a bit rate of a digital image signal;

quantization means; and rounding means provided at least on one portion of said digital image signal recording apparatus for rounding a calculated result of a signal by omitting selected bits from a numeral representing said calculated result, wherein when values of the portion of the numeral placed after the omitted bits are 1000 in binary notation (i.e., 0.5 in decimal notation), said rounding means detects whether an integral part of said numeral is an even or odd number, i.e., whether a least significant bit of an integral part of the binary notation of said numeral is 0 or 1 such that if said least significant bit is 0, said rounding means rounds said numeral to a closest even number by omitting said selected bits and if said least significant bit is 1 by adding a predetermined value to said numeral and then omitting said selecting bits.

2. A digital image signal recording apparatus according to claim 1, wherein said bit rate reduction means is a discrete cosine transform circuit.

3. A digital image signal recording apparatus according to claim 1, wherein said bit rate reduction means is a wavelet-transform circuit.

* * * * *